United States Patent
Tomizuka et al.

(10) Patent No.: US 10,345,646 B2
(45) Date of Patent: Jul. 9, 2019

(54) DISPLAY APPARATUS

(71) Applicant: Sakai Display Products Corporation, Osaka (JP)

(72) Inventors: Harumasa Tomizuka, Osaka (JP); Motoaki Okitsu, Osaka (JP)

(73) Assignee: Sakai Display Products Corporation, Osaka (JP)

( * ) Notice: Subject to any disclaimer, the term of this patent is extended or adjusted under 35 U.S.C. 154(b) by 0 days.

(21) Appl. No.: 15/878,819

(22) Filed: Jan. 24, 2018

(65) Prior Publication Data

US 2018/0149924 A1 May 31, 2018

Related U.S. Application Data

(63) Continuation-in-part of application No. PCT/JP2015/071401, filed on Jul. 28, 2015.

(51) Int. Cl.
*F21V 7/04* (2006.01)
*G02F 1/1335* (2006.01)
*G02F 1/1333* (2006.01)

(52) U.S. Cl.
CPC .. *G02F 1/133608* (2013.01); *G02F 1/133308* (2013.01); *G02F 1/133606* (2013.01); *G02F 1/133611* (2013.01); *G02F 2001/133322* (2013.01); *G02F 2001/133607* (2013.01)

(58) Field of Classification Search
CPC ......... G02F 1/133308; G02F 1/133606; G02F 1/133608; G02F 1/133611; G02F 2001/133322; G02F 2001/133607
USPC .................. 362/97.1–97.4, 606–607; 349/58
See application file for complete search history.

(56) References Cited

U.S. PATENT DOCUMENTS

| | | | |
|---|---|---|---|
| 9,897,852 B2 * | 2/2018 | Ma | G02F 1/133608 |
| 2006/0088270 A1 | 4/2006 | Fan et al. | |
| 2013/0235295 A1 | 9/2013 | Tang | |
| 2015/0078032 A1 | 3/2015 | Horiguchi et al. | |
| 2016/0356952 A1 | 12/2016 | Kawabata et al. | |

FOREIGN PATENT DOCUMENTS

| | | | |
|---|---|---|---|
| JP | 2002311430 A | 10/2002 | |
| JP | 2007057583 A | 3/2007 | |
| JP | 2010197937 A | 9/2010 | |

(Continued)

OTHER PUBLICATIONS

English Translation of the International Search Report, PCT International Application No. PCT/JP2015/071401, Japan Patent Office, Tokyo, Japan. dated Oct. 13, 2015.

*Primary Examiner* — Jason M Han
(74) *Attorney, Agent, or Firm* — Marsh Fischmann & Breyfogle LLP

(57) ABSTRACT

This display apparatus includes an optical sheet, and a holding member 4 holding a peripheral part of the optical sheet. The optical sheet has a hooking part 312 extended from the optical sheet. The holding member 4 has a hooked part 46 to which the hooking part of the optical sheet is hooked. The hooked part 46 has at least one movement-prevention part 43 for preventing the hooking part 312 from moving. Thus, disengagement of the optical sheet from the holding member 4 and positional deviation of the optical sheet are prevented when heat is generated during driving of the display apparatus and the optical sheet undergoes thermal expansion.

17 Claims, 9 Drawing Sheets

(56) References Cited

FOREIGN PATENT DOCUMENTS

| | | |
|---|---|---|
| JP | 2011186179 A | 9/2011 |
| JP | 2012113873 A | 6/2012 |
| WO | 2012070332 A1 | 5/2012 |
| WO | 2014069405 A1 | 5/2014 |
| WO | 2014129369 A1 | 8/2014 |
| WO | 2015075834 A1 | 5/2015 |

\* cited by examiner

DISPLAY APPARATUS

CROSS-REFERENCE TO RELATED APPLICATION

This is a continuation-in-part of PCT international application No. PCT/JP2015/071401 filed on Jul. 28, 2015, incorporated herein by reference.

BACKGROUND OF THE INVENTION

The present disclosure relates to a display apparatus comprising an optical sheet and a holding member holding the optical sheet.

BACKGROUND ART

Recently so-called flat-screen display apparatuses have spread, and in the flat-screen display apparatuses, a variety of features has been made to realize a narrow frame reducing a width of a frame outside a display screen.

For example, in order to realize a narrow frame, WO 2014/069405 discloses a display apparatus comprising an optical sheet having a circular engaging part and a panel chassis having a hook engaged with the engaging part, and the optical sheet is attached to the panel chassis.

However, in the display apparatus according to WO 2014/069405, the optical sheet is attached to the panel chassis just by hooking the circular engaging part on the hook. Therefore, when heat generated during operation of the display apparatus causes thermal expansion of the optical sheet, engagement between the engaging part and the hook becomes loose, and the engaging part and the hook may be disengaged.

SUMMARY OF THE INVENTION

The present invention has been made in view of such circumstances as mentioned above, and an object of the present invention is to provide a display apparatus comprising an optical sheet and a holding member holding the optical sheet and provided at a peripheral part of the optical sheet, wherein, even when thermal expansion of the optical sheet occurs due to heat generated during driving of the display apparatus, the optical sheet is not disengaged from the holding member, and positional deviation of the optical sheet does not occur.

A display apparatus according to one embodiment of the present invention comprises an optical sheet, a holding member holding a peripheral part of the optical sheet, and a hooking part extended from the optical sheet, wherein the holding member has a hooked part to which the hooking part is hooked, the hooked part of the holding member has at least one movement-prevention part for preventing the hooking part from moving, the optical sheet comprises a plurality of stacked unit sheets including a first sheet and at least one remaining sheet other than the first sheet, each of the first sheet and the at least one remaining sheet having the hooking part, and the first sheet has a recess at an edge of the first sheet, and position of the recess of the first sheet corresponds along the edge of the optical sheet to that of the hooking part extended from the at least one remaining sheet.

According to the embodiment, movement of the hooking part is prevented by the at least one movement-prevention part. Therefore, disengagement of the optical sheet held by the holding member via the hooking part from the holding member due to thermal expansion or positional deviation of the optical sheet can be prevented. According to the embodiment, the optical sheet comprises a plurality of stacked unit sheets including a first sheet and at least one remaining sheet other than the first sheet, each of the first sheet and the at least one remaining sheet having the hooking part, and the first sheet has a recess at an edge of the first sheet, and position of the recess of the first sheet corresponds along the edge of the optical sheet to that of the hooking part extended from the at least one remaining sheet. Therefore, when the hooking part extended from the at least one remaining sheet is hooked to the hooked part of the holding member, the hooking part extended from the at least one remaining sheet is not interfered or blocked by the edge of the first sheet.

In another embodiment of the display apparatus according to the present invention, a perforation is provided at a boundary between the optical sheet and the hooking part extended from the optical sheet.

In another embodiment of the display apparatus according to the present invention, the hooking part extended from the first sheet is provided at a position not overlapping with the hooking part extended from the at least one remaining sheet.

In another embodiment of the display apparatus according to the present invention, the at least one movement-prevention part is protruded from and is folded back at an end portion, which contacts the optical sheet at a boundary between the optical sheet and the hooking part extended from the optical sheet, of the holding member.

In another embodiment of the display apparatus according to the present invention, the at least one movement-prevention part comprises at least one pair of movement-prevention parts, the holding member has a pair of rod-shaped parts as the at least one pair of movement-prevention parts, the pair of rod-shaped parts are spaced apart from each other along the edge of the optical sheet, and the hooking part has notches formed on opposite ends, which are opposing each other in a direction along the edge of the optical sheet, of the hooking part and each of the notches engages with each of the pair of rod-shaped parts so that the hooking part is sandwiched by the pair of rod-shaped parts.

In another embodiment of the display apparatus according to the present invention, the at least one movement-prevention part is formed in a rectangular plate, the hooking part has (i) a base portion whose longitudinal direction being along the boundary of the optical sheet, and (ii) a pair of L-shaped bent portions each of which having (a) a body portion protruded from the base portion and (b) a tip portion protruded along the boundary from an end of the body portion, the pair of L-shaped bent portions are spaced apart in the longitudinal direction of the base portion and the tip portion of one of the bent portions and the tip portion of another of the bent portions face each other.

In another embodiment of the display apparatus according to the present invention, the optical sheet is formed in a rectangular shape with four sides including a first side and a second side parallel to each other, and the hooking part is provided on each of the first side and the second side of the optical sheet, the hooking part extended from the first side confronting directly the hooking part extended from the second side.

In another embodiment of the display apparatus according to the present invention, the hooking part is provided in a center of or around the center of each of the first side and the second side of the optical sheet.

In another embodiment of the display apparatus according to the present invention, the optical sheet is formed in a rectangular shape with four sides including a first side and a second side parallel to each other, and the display apparatus further comprises a box-shaped chassis to which the holding member is attached, the box-shaped chassis having side walls, and a positioning part for positioning the holding member, the positioning part being provided on at least one of the side walls of the box-shaped chassis, wherein the positioning part is located in a center of or around the center of the at least one of the side walls along the first or second side of the optical sheet, or located near the hooked part of the holding member.

A display apparatus according to yet another embodiment of the present invention comprises an optical sheet, a holding member holding a peripheral part of the optical sheet, and a hooking part extended from the optical sheet, wherein the holding member has a hooked part to which the hooking part is hooked, the hooked part of the holding member has at least one movement-prevention part for preventing the hooking part from moving, the at least one movement-prevention part is protruded from and is folded back at an end portion, which contacts the optical sheet at a boundary between the optical sheet and the hooking part extended from the optical sheet, of the holding member, and the hooking part is sandwiched in a direction along the edge of the optical sheet by the at least one movement-prevention part or sandwiches the at least one movement-prevention part in the direction along the edge of the optical sheet.

In yet another embodiment, a perforation is provided at a boundary between the optical sheet and the hooking part extended from the optical sheet.

In yet another embodiment, the optical sheet comprises a plurality of stacked unit sheets including a first sheet and at least one remaining sheet other than the first sheet, each of the first sheet and the at least one remaining sheet having the hooking part, and the hooking part extended from the first sheet is provided at a position not overlapping with the hooking part extended from the at least one remaining sheet.

In yet another embodiment, the at least one movement-prevention part comprises at least one pair of movement-prevention parts, the holding member has a pair of rod-shaped parts as the at least one pair of movement-prevention parts, the pair of rod-shaped parts are spaced apart from each other along the edge of the optical sheet, and the hooking part has notches formed on opposite ends, which are opposing each other in a direction along the edge of the optical sheet, of the hooking part and each of the notches engages with each of the pair of rod-shaped parts so that the hooking part is sandwiched by the pair of rod-shaped parts.

In yet another embodiment, the at least one movement-prevention part is formed in a rectangular plate, the hooking part has (i) a base portion whose longitudinal direction being along the boundary of the optical sheet, and (ii) a pair of L-shaped bent portions each of which having (a) a body portion protruded from the base portion and (b) a tip portion protruded along the boundary from an end of the body portion, the pair of L-shaped bent portions are spaced apart in the longitudinal direction of the base portion and the tip portion of one of the bent portions and the tip portion of another of the bent portions face each other.

In yet another embodiment, the optical sheet is formed in a rectangular shape with four sides including a first side and a second side parallel to each other, and the hooking part is provided on each of the first side and the second side of the optical sheet, the hooking part extended from the first side confronting directly the hooking part extended from the second side.

In yet another embodiment, the hooking part is provided in a center of or around the center of each of the first side and the second side of the optical sheet.

In yet another embodiment, the optical sheet is formed in a rectangular shape with four sides including a first side and a second side parallel to each other, and the display apparatus further comprises a box-shaped chassis to which the holding member is attached, the box-shaped chassis having side walls, and a positioning part for positioning the holding member, the positioning part being provided on at least one of the side walls of the box-shaped chassis, wherein the positioning part is located in a center of or around the center of the at least one of the side walls along the first or second side of the optical sheet, or located near the hooked part of the holding member.

According to the embodiment of the present invention, disengagement of the optical sheet from the holding member is prevented without additional components and without interference of narrowing of the frame of the display apparatus, and positional deviation of the optical sheet does not occur even when thermal expansion of the optical sheet occurs due to heat generated during driving of the display apparatus.

DETAILED DESCRIPTION

A display apparatus according to an embodiment of the present invention is described below with an example where it is applied to a television receiver comprising a so-called liquid-crystal display panel, in reference to the drawings.

Figure 1:
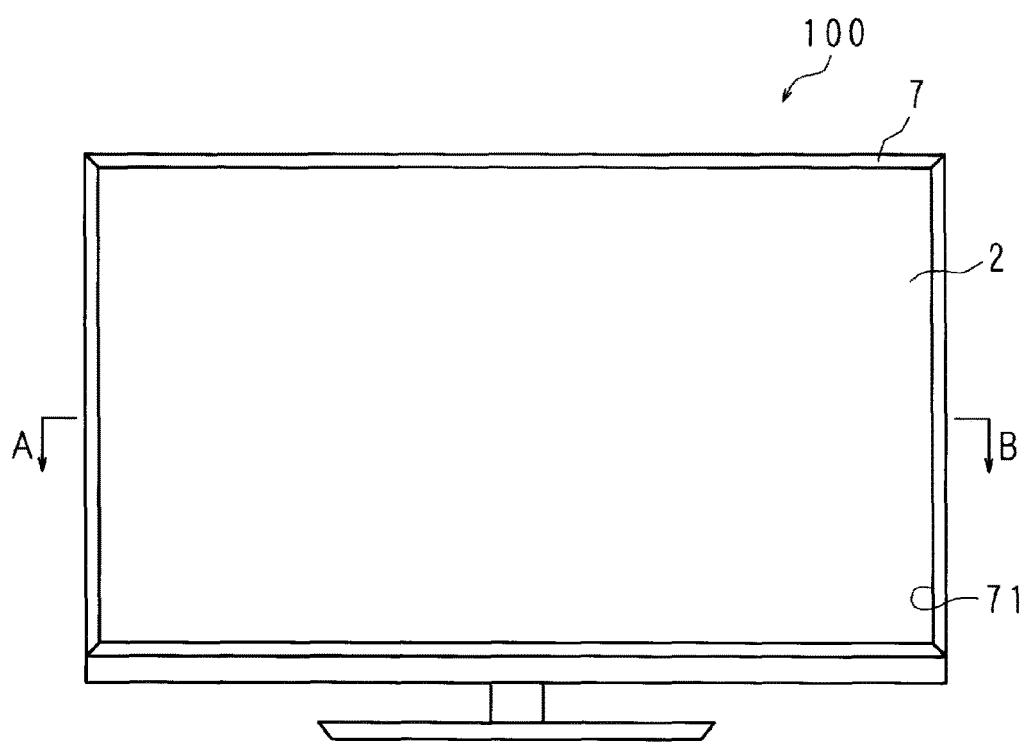
FIG. 1 is a front view showing an external appearance of a television receiver according to an embodiment of the present invention.

FIG. 1 is a front view showing an external appearance of a television receiver according to an embodiment of the present invention. In FIG. 1, a reference number 100 represents the television receiver according to the embodiment. The television receiver 100 according to the embodiment is, for example, a 70 inch television receiver. Hereinafter, for the purpose of illustration, the right and left direction of the television receiver 100 in FIG. 1 is referred to as a lateral direction, and a vertical direction in FIG. 1 is referred to as a longitudinal direction. A front (front surface of a liquid crystal display panel 2 described below) and rear direction of the television receiver 100 is referred to as a thickness direction.

Figure 2:
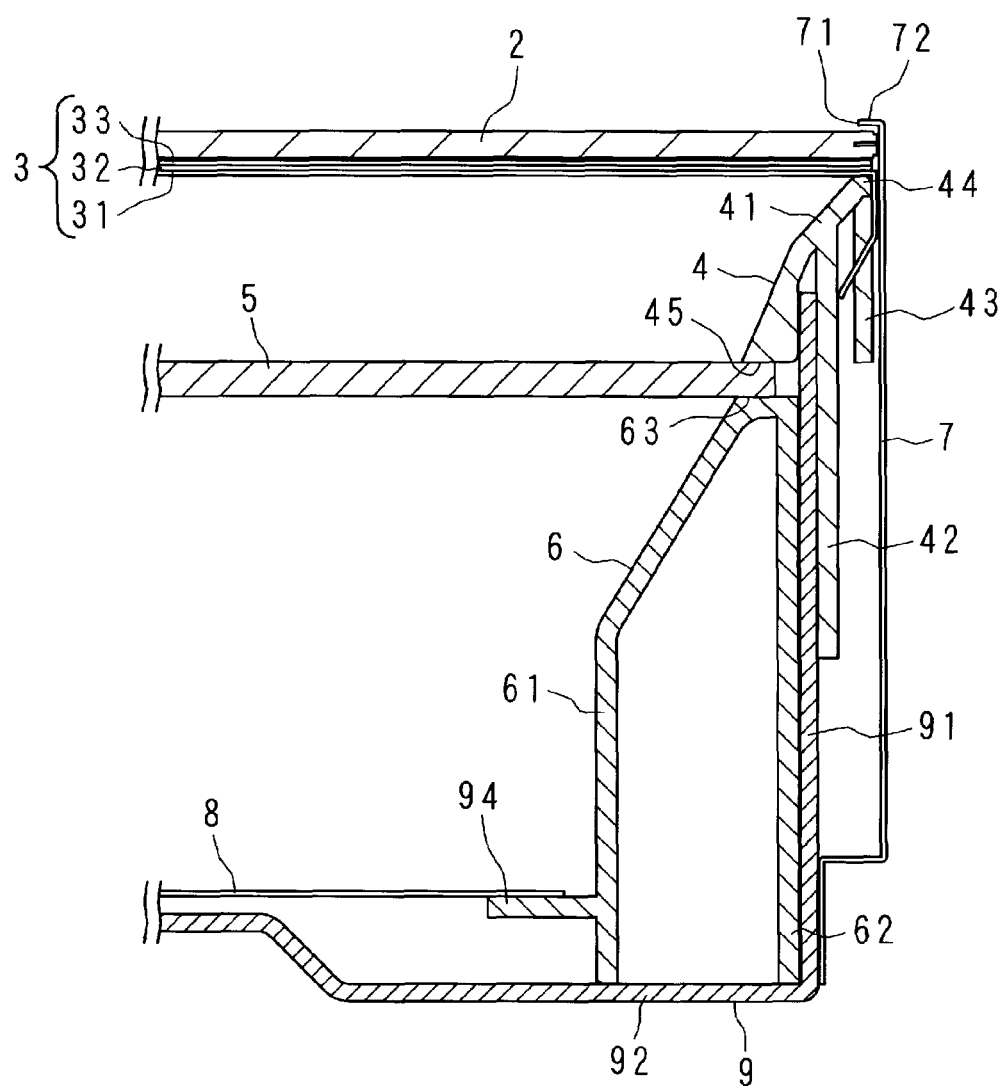
FIG. 2 is a cross-sectional view along a line A-B of FIG. 1.

FIG. 2 shows a cross-sectional view along a line A-B of FIG. 1. FIG. 2 schematically shows a structure of the television receiver 100 according to the embodiment. The television receiver 100 according to the embodiment is provided with a rectangular liquid crystal display panel 2 displaying an image as shown in FIG. 1. The liquid crystal display panel 2 has a display surface displaying an image and a light-entering surface opposite to the display surface. The television receiver 100 is provided with an optical sheet 3, a diffusion plate 5 and a reflection sheet 8 rearward of the liquid crystal display panel 2, in this order.

The diffusion plate 5 and the reflection sheet 8 are accommodated in a back light chassis 9 formed in a box shape. The peripheral part of the optical sheet 3 and side walls of the back light chassis 9 are surrounded by a bezel 7 formed in a rectangular frame shape having an opening to expose the display surface of the liquid crystal display.

The optical sheet 3 has a front surface facing a light-entering surface of the liquid crystal display panel 2 and a rear surface opposite to the front surface. The diffusion plate 5 has a first surface facing the rear surface of the optical sheet 3 and a second surface opposite to the first surface of the diffusion plate 5. The first surface of the diffusion plate 5 may also be referred to as the "front surface". The second surface opposite to the first surface may also be referred to as the "second surface". The diffusion plate 5 is disposed so that the front surface of the diffusion plate 5 faces a rear surface of the optical sheet 3. The reflection sheet 8 is disposed so that a reflective surface of the reflection sheet 8 faces the rear surface of the diffusion plate 5.

At a peripheral part of the front of the liquid crystal display panel 2, front end part of the bezel 7 is located in a thickness direction of the television receiver 100. The bezel 7 is formed in a rectangular frame shape and has a rectangular display window 71 opening in front of the display surface of the liquid crystal display panel 2. An image displayed on the display surface of the liquid crystal display panel 2 is visible by a user through the display window 71.

The front end part of the bezel 7 is overlapped with the peripheral part of the display surface of the liquid crystal display panel 2 by a predetermined width. Hereinafter, the front end part is referred to as frame part 72. The peripheral part of the display surface of the liquid crystal display panel 2 is covered with the frame part 72 in a rectangular shape.

The liquid crystal display panel 2 has a polarizing sheet (not shown) on the light-entering surface of the liquid crystal display panel 2. The polarizing sheet separates light entered into the polarizing sheet into P wave (horizontal polarized light component) and S wave (vertical polarized light component), and only P wave goes out toward the display surface of the liquid crystal display panel 2 and S wave is absorbed in the polarizing sheet. The liquid crystal display panel 2 may be, for example, an electrophoretic liquid crystal panel.

The optical sheet 3 facing the light-entering surface of the liquid crystal display panel 2 is a known optical sheet. Light emitted from a light source described below and entered into the optical sheet 3 through the diffusion plate 5 is diffused and condensed by the optical sheet 3, and then, more uniform light is emitted from the optical sheet 3 toward the liquid crystal display panel 2. For example, the optical sheet 3 comprises a plurality of stacked unit sheets including a first sheet and at least one remaining sheet other than the first sheet. The number of stacked unit sheets is not limited. In the embodiment, the optical sheet 3 comprises three unit sheets 31, 32, 33. In particular, the optical sheet 3 comprises a first diffusion sheet 31, a prism sheet 32 and a second diffusion sheet 33, and the prism sheet 32 is sandwiched between the first diffusion sheet 31 and the second diffusion sheet 33. The first diffusion sheets 31, the prism sheet 32 and the second diffusion sheet 33 are in a rectangular shape and have the same size. Hereinafter, the first diffusion sheets 31, the prism sheet 32 and the second diffusion sheet 33 are also referred to as unit sheets.

The first diffusion sheet 31 is facing the diffusion plate 5. The first diffusion sheet 31 diffuses light entering from a light source through the diffusion plate 5 and emits the light into the prism sheet 32. The prism sheet 32 condenses the light entered through the first diffusion sheet 31 and emits the light toward the second diffusion sheet 33. The light passed through the prism sheet 32 is entered into the second diffusion sheet 33 vertically to the prism sheet 32.

The second diffusion sheet 33 facing the liquid crystal display panel 2 further diffuses the light entered through the prism sheet 32 and emits the light with more uniform luminance distribution toward the light-entering surface of the liquid crystal display panel 2.

In the vicinity of the peripheral part of the rear surface of the optical sheet 3, a holding member 4 for holding the optical sheet 3 is provided. In particular, the holding member 4 is disposed between the peripheral part of the optical sheet 3 and the peripheral part of the diffusion plate 5. The holding member 4 has an inclined part 41 and a vertical plate 42. The inclined part 41 has an inclined surface extending at an obtuse angle with respect to the front surface of the diffusion plate 5. The vertical plate 42 protrudes from a rear surface of the inclined part 41 vertically to the optical sheet 3.

The holding member 4 comprises a first end portion 44 contacting the peripheral part of the rear surface of the optical sheet 3, thereby allowing the optical sheet 3 to be held by the holding member 4. On the other hand, the holding member 4 comprises a second end portion contacting the peripheral part of the front surface of the diffusion plate 5. In this embodiment, a flat end surface 45 of the second end portion of the holding member 4 contacts the peripheral part of the front surface of the diffusion plate 5. Thus, a given interval is maintained between the optical sheet 3 and the diffusion plate 5. A reflection film is formed on a front of the inclined part 41. The reflection film reflects light emitted from the front surface of the diffusion plate 5 toward the liquid crystal display panel 2.

A specific space is formed between the second end portion of the inclined part 41 and the vertical plate 42 in the region behind the inclined part 41, and this space is substantially the same as the thickness of a side wall 91 of the back light chassis 9 described below. Namely, by putting the side wall 91 of the back light chassis 9 into the space between the second end portion of the inclined part 41 and the vertical plate 42, the holding member 4 is held by the back light chassis 9.

The holding member 4 has at least one movement-prevention part 43 as described below. In the embodiment, the holding member 4 has a plurality of movement-prevention parts 43. The holding member 4 comprises at least one pair of movement-prevention parts 43, 43. The holding member 4 has a pair of rod-shaped parts as the pair of movement-prevention parts 43, 43. The rod-shaped parts are elongated in a thickness direction of the optical sheet 3, i.e. a stacking direction of a first sheet and at least one remaining sheet other than the first sheet (the first diffusion sheet 31, the prism sheet 32 and the second diffusion sheet 33) of the optical sheet 3. The movement-prevention part 43 is protruded from and is folded back at the first end portion 44, which contacts the optical sheet 3 at a boundary between the optical sheet 3 and the hooking part 312 extended from the optical sheet 3, of the inclined part 41 of the holding member 4. The movement-prevention part 43 prevents a hooking part 312 extended from the optical sheet 3, which will be described later, from moving in a direction along the rear surface of the optical sheet 3. In this embodiment, the pair of the rod-shaped parts (movement-prevention parts 43) are spaced apart from each other along the edge of the optical sheet 3 with a predetermined distance for the hooking part 312. A plurality of pairs of the rod-shaped parts are provided at several positions of the first end portion 44 of the inclined plate part 41 along the edge of the optical sheet 3. More specifically, the number of the pairs of the movement-prevention parts 43 corresponds to the number of the unit sheets of the optical sheet 3. The movement-prevention part 43 will be described in detail below.

The rectangular diffusion plate 5 is disposed facing the rear surface of the optical sheet 3. Namely, the front surface of the diffusion plate 5 is disposed facing the rear surface of the optical sheet 3 and apart from the rear surface of the optical sheet 3. The light emitted from the light source and entered through the rear surface of the diffusion plate 5 is diffused in the diffusion plate 5 and the light is emitted from the front surface of the diffusion plate 5 toward the optical sheet 3.

The diffusion plate 5 is made of, for example, a milky white resin (acrylic resin, polycarbonate resin or the like) in which a dispersing agent is added. When a point light source such as LED is used, the diffusion plate 5 diffuses the light from each point source of light and emits the light through the diffusion plate 5 uniformly from the front surface as surface emission.

A holding frame 6 for holding the diffusion plate 5 is provided in the vicinity of the peripheral part of the rear surface of the diffusion plate 5. The holding frame 6 has a tapered shape in a cross-sectional view, in which a width of the holding frame 6 is reduced toward a front end part of the holding frame 6. The front end part contacts the peripheral part of the rear surface of the diffusion plate 5. The holding frame 6 has an outer wall 62 vertical to the diffusion plate 5, and an inner wall 61 having an inclined part inclined with respect to the diffusion plate 5 from the front end part up to the middle part of the holding frame 6. The holding frame 6 has a flat surface 63 at the front end part, and the peripheral part of the rear surface of the diffusion plate 5 contacts the flat surface 63. The peripheral part of the diffusion plate 5 is sandwiched by the flat end surface 45 of the second end portion of the holding member 4 and the flat surface 63 of the front end part of the holding frame 6.

The holding frame 6 is disposed on a bottom 92 of the back light chassis 9 formed in a box shape so that the outer wall 62 of the holding frame 6 contacts an inner surface of the side wall 91 of the back light chassis 9. The holding frame 6 has a sheet-holding protrusion 94 for holding the reflection sheet 8. The sheet-holding protrusion 94 protrudes from the inner wall 61 of the holding frame 6 and extended along the rear surface of the diffusion plate 5. The sheet-holding protrusion 94 is formed in a rectangular shape and is provided at a rear end part of the holding frame 6 near the bottom 92 of the back light chassis 9. A reflection film is formed on an inner surface of the inner wall 61 in order to reflect light emitted from the light source toward the diffusion plate 5.

The reflection sheet 8 is, for example, in a rectangular shape, and is held on the sheet-holding protrusion 94 so that the reflective surface of the reflection sheet 8 faces the rear surface of the diffusion plate 5. In particular, the reflection sheet 8 is held so that the peripheral part on a rear surface of the reflection sheet 8 contacts the sheet-holding protrusion 94 and the reflective surface of the reflection sheet 8 faces the rear surface of the diffusion plate 5. Thus, a predetermined space is secured between the diffusion plate 5 and the reflection sheet 8.

Further, the light source (not shown) is provided on the reflective surface of the reflection sheet 8. Examples of the light source include a cold cathode fluorescent lamp (CCFL), an external electrode fluorescent lamp (EEFL), a hot cathode fluorescent lamp (HCFL), a light emitting diode (LED) and the like.

The bezel 7 is disposed so as to surround the peripheral part of the liquid crystal display panel 2, the peripheral part of the optical sheet 3, movement-prevention part 43 of the holding member 4 and the side wall 91 of the back light chassis 9.

In the television receiver 100 according to the embodiment, the optical sheet 3 can be more easily and reliably positioned, and positional deviation of the optical sheet 3 can be prevented. Detailed explanation follows below.

Figure 3:
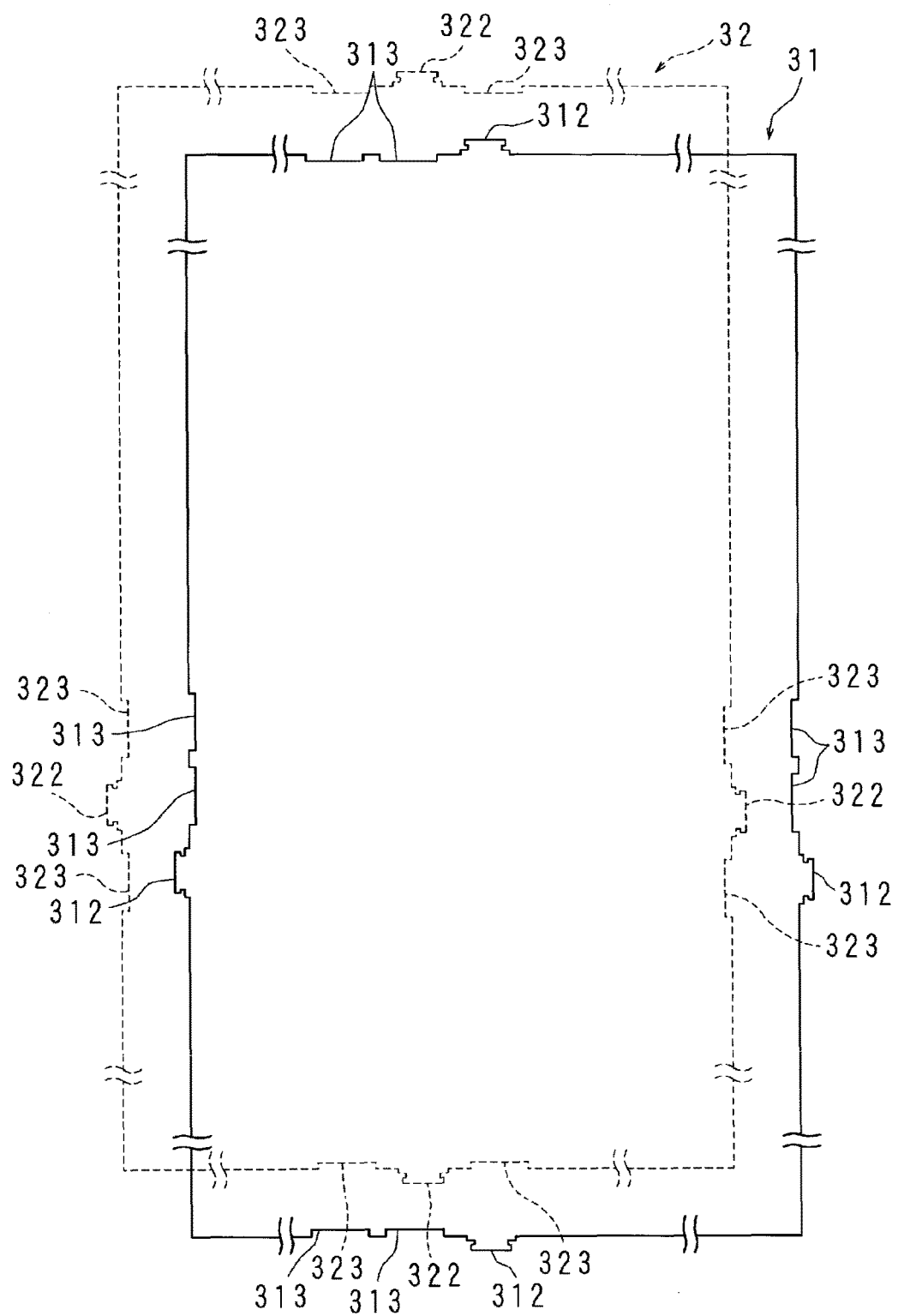
FIG. 3 is an explanatory view to illustrate a shape of an optical sheet of the television receiver according to the embodiment.
Figure 4:
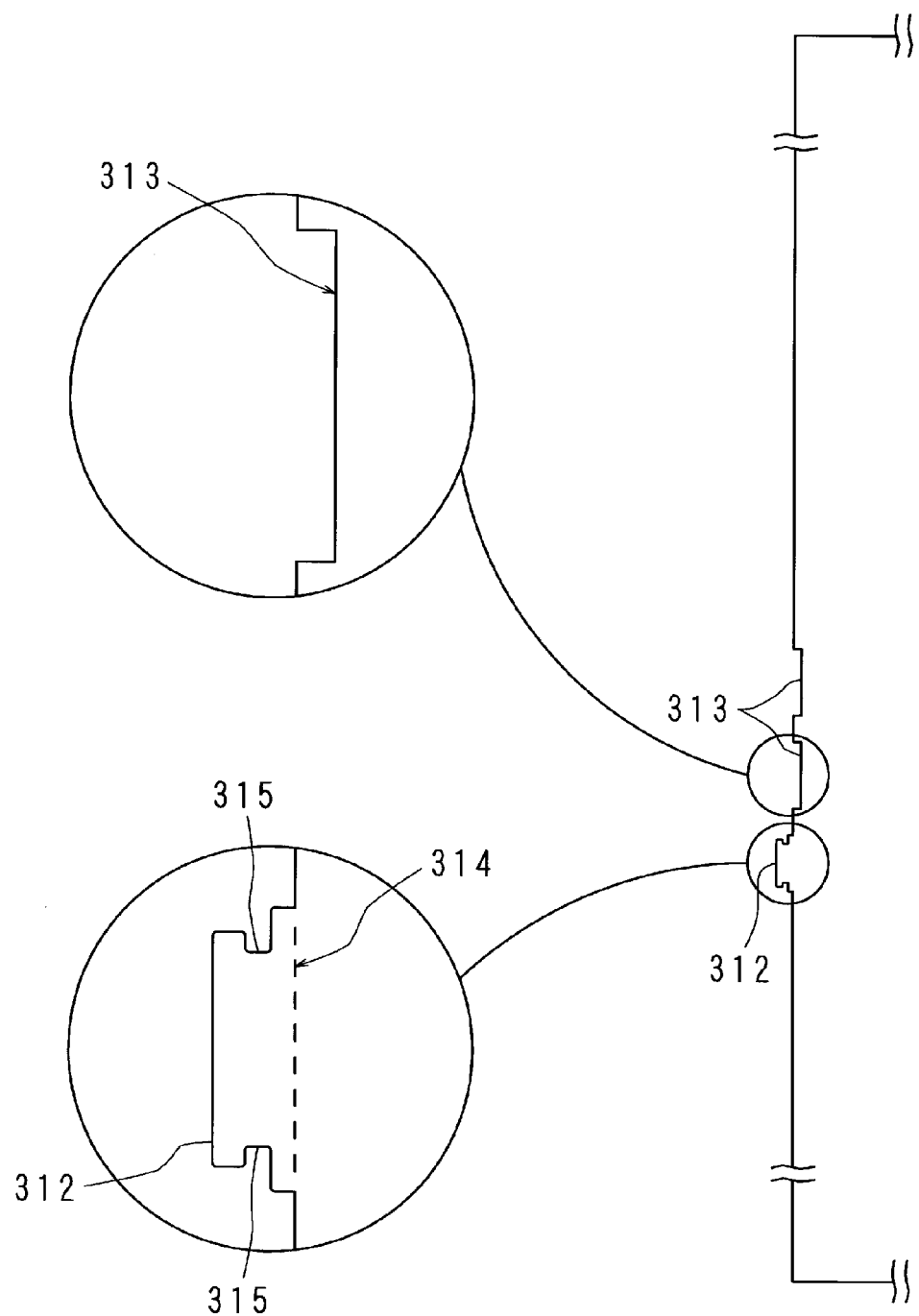
FIG. 4 is a partial enlarged view of the optical sheet of the television receiver according to the embodiment.

FIG. 3 is an explanatory view to illustrate the shape of the optical sheet 3 of the television receiver 100 according to the embodiment, and FIG. 4 is a partial enlarged view of the optical sheet 3 of the television receiver 100 according to the embodiment. In FIG. 3, for the convenience of explanation, only the first diffusion sheet 31 and the prism sheet 32 of the optical sheet 3 are shown. The prism sheet 32 is illustrated in a dotted line at a shifted position relative to the first diffusion sheet 31 so that they can be contrasted. In the following, for the convenience of explanation, examples of the first diffusion sheet 31 and the prism sheet 32 are explained, and explanation of the second diffusion sheet 33 is omitted.

As shown in FIG. 3 and FIG. 4, a hooking part 312 is extended from the first diffusion sheet 31 for attachment to the holding member 4. A hooking part 322 is protruded from the prism sheet 32 for attachment to the holding member 4. In this embodiment, a plurality of hooking parts 312 are extended from the first diffusion sheet 31 and a plurality of hooking parts 322 are extended from the prism sheet 32. Each of the hooking parts 312 is extended from each of the edges of the diffusion sheet 31, and each of the hooking parts 322 is extended from each of the edges of the prism sheet 32. Although FIG. 3 and FIG. 4 show an example where one hooking part 312 is provided on each edge of the diffusion sheet 31, the number of the hooking part 312 is not limited and two or more hooking parts may be provided on each edge of the diffusion sheet 31.

The hooking part 312 and the hooking part 322 are substantially rectangular and provided in such a way that a longitudinal direction of the hooking part 312 and the hooking part 322 is parallel to the edge of the optical sheet 3. The hooking part 312 has notches 315, 315 formed on opposite ends, which are opposing each other in a direction along the edge of the optical sheet 3, of the hooking part 312. In the embodiment, the hooking part 312 has a base portion whose longitudinal direction being along the boundary of the optical sheet 3 and a body portion protruded from the base portion and having notches 315, 315 formed on the opposite ends, which are opposing each other along the edge of the optical sheet 3. Further, the hooking part 312 has a tip portion protruded from an end of the body portion. The length of the tip portion of the hooking part 312 along the edge of the optical sheet 3 is longer than that of the body portion and two notches 315, 315 are formed on opposite ends of the body portion between the tip portion and the base portion. The hooking part 322 has notches 325, 325 (not shown) formed on the opposite ends, which are opposing each other along the edge of the optical sheet 3. The notches 315, 315 of the hooking part 312 are formed so that the pair of movement-prevention parts 43, 43 of the holding member 4 engage with the notches 315, 315. In the embodiment, each of the notches 315, 315 engages with each of the pair of rod-shaped parts (pair of movement-prevention parts 43) so that the hooking part 312 is sandwiched by the pair of rod-shaped parts. The length of each of the tip portions of the hooking part 312 and the hooking part 322 along the edge of the optical sheet 3 is longer than the length of the space between the pair of the movement prevention parts 43, and the length of the body portion along the edge of the optical sheet 3 is slightly shorter than the length of the space between the pair of the movement prevention parts 43.

A perforation 314 is provided at a boundary between the optical sheet 3 and the hooking part 312 extended from the optical sheet 3. In the embodiment, the perforation 314 is provided at a boundary between the optical sheet 3 and the base portion of the hooking part 312 along the edge of the optical sheet 3. Similarly, a perforation is provided at a boundary between the optical sheet 3 and the base portion of the hooking part 322. Thus the hooking part 312 and the hooking part 322 are easy to be folded when the hooking part 312 and the hooking part 322 are hooked to the hooked part 46, which will be described below.

Figure 5:
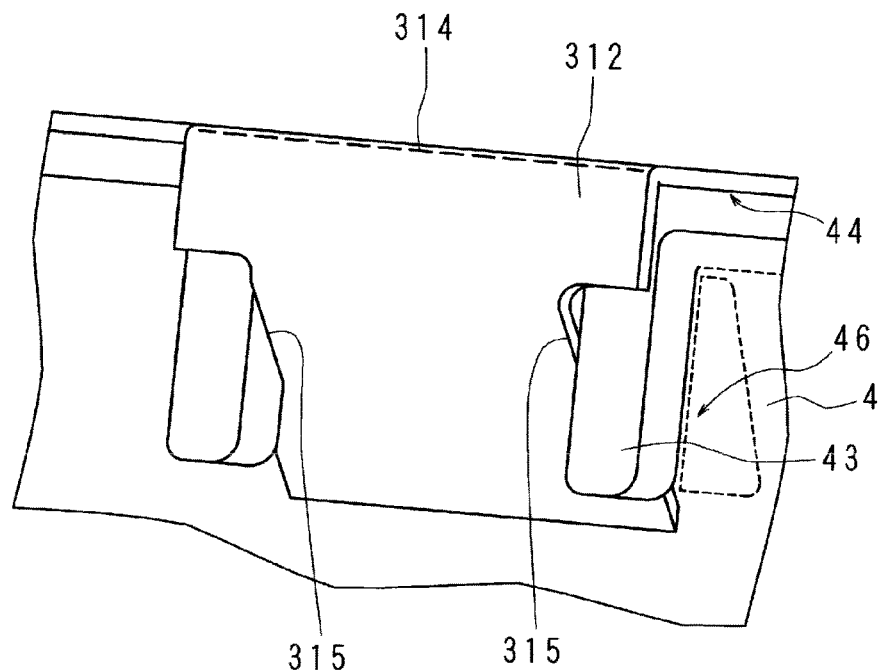
FIG. 5 is an explanatory view to illustrate attachment of the optical sheet to the holding member in the television receiver according to the embodiment.

FIG. 5 is an explanatory view to illustrate attachment of the optical sheet 3 to the holding member 4 in the television receiver 100 according to the embodiment. In FIG. 5, for the convenience of explanation, only the first diffusion sheet 31 of the optical sheet 3 is shown.

The hooking part 312 is folded toward the holding member 4 at the perforation 314, and then pushed into the space between a pair of the movement prevention parts 43, 43 so that the body portion of the hooking part 312 is sandwiched (interposed) and held between the pair of the movement prevention parts 43, 43. In this case, the peripheral part of the diffusion sheet 31 contacts the first end portion 44 of the holding member 4 and each of the movement-prevention parts 43 engages with each of the notches 315 of the hooking part 312. Therefore, hooking of the hooking part 312 and the hooked part 46 does not become loose even when thermal expansion of the optical sheet 3 occurs due to heat generated during driving of the television receiver 100.

In the embodiment, the holding member 4 has the hooked part 46 comprising the pair of the movement-prevention parts 43 at the rear surface of the inclined part 41 and the hooked part 46 corresponds to the hooking part 312 of the diffusion sheet 31. When the hooking part 312 is hooked to the hooked part 46, the first diffusion sheet 31 is attached to the holding member 4.

This prevents the first diffusion sheet 31 from being disengaged from the holding member 4 and prevents the hooking part 312 extended from the optical sheet 3 from moving along the rear surface of the optical sheet 3 with respect to the first end portion 44.

As described above, in the embodiment, the first diffusion sheet 31 is formed in a rectangular shape with four sides, and at least one hooking part 312 is provided on each side of the first diffusion sheet 31. In this case, such effect can be obtained more reliably. It should be noted that the above configuration can be applied to the remaining sheets (prism sheet 32 and the second diffusion sheet 33) in order to obtain the above effect, and detailed explanation is omitted.

When one hooking part is provided on each side of the optical sheet 3, it is configured that the hooking part is provided in the center of or around the center of the side of the unit sheet. In this case, the hooking parts of the optical sheet 3 are positioned closer to the center of gravity, which is the origin of the thermal expansion of the optical sheet 3 due to heat generated during operation of the television receiver 100, than the corner of the optical sheet 3. Therefore, influence of the expansion of the optical sheet 3 can be minimized.

Figure 6:
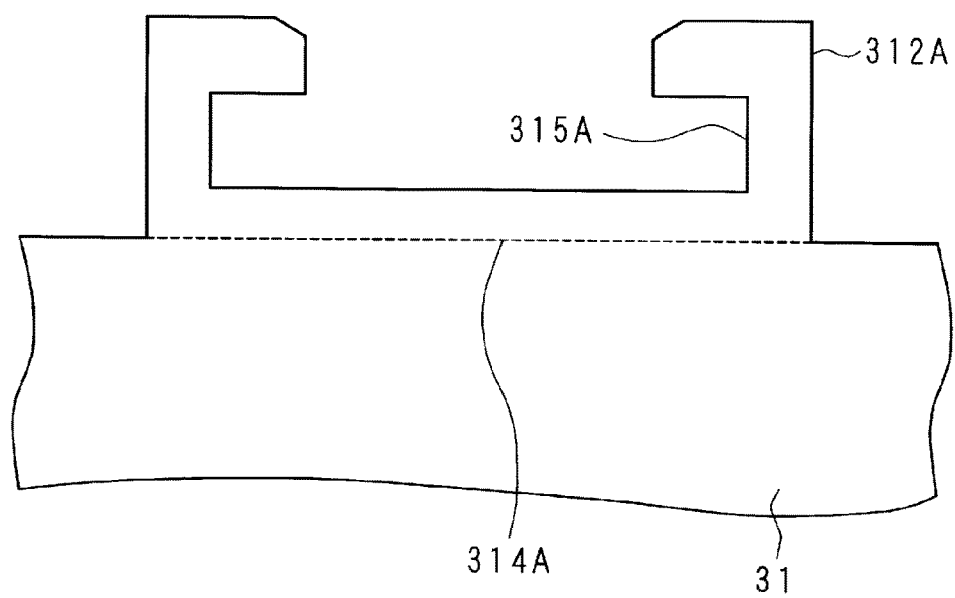
FIG. 6 is an explanatory view to show a variation of a hooking part extended from the optical sheet of the television receiver according to the embodiment.

The configuration of the hooking parts 312, 322, 332 are not limited to the above description. FIG. 6 is an explanatory view to show a variation of the hooking part of the optical sheet 3 of the television receiver 100 according to the embodiment. In the following, for the convenience of explanation, the example of the hooking part 312A for the first diffusion sheet 31 is explained; however, needless to say, other hooking parts for the prism sheet 32 or the second diffusion sheet 33 can be similar to the hooking part 312A.

The hooking part 312A has a strip-shaped base portion whose longitudinal direction being along the boundary of the diffusion sheet 31. The hooking part 312A has a pair of L-shaped bent portions protruded from the base portion and provided on the opposite ends of the base portion. Each of the pair of L-shaped bent portions has a body portion protruded from the base portion and a tip portion protruded along the boundary of the diffusion sheet 31 from an end of the body portion. The pair of L-shaped bent portions are spaced apart in the longitudinal direction of the base portion. The tip portion of one of the bent portions and the tip portion of another of the bent portions face each other. Therefore, two notches 315A, 315A are formed to the hooking part 312A by the pair of L-shaped bent portions.

Figure 7:
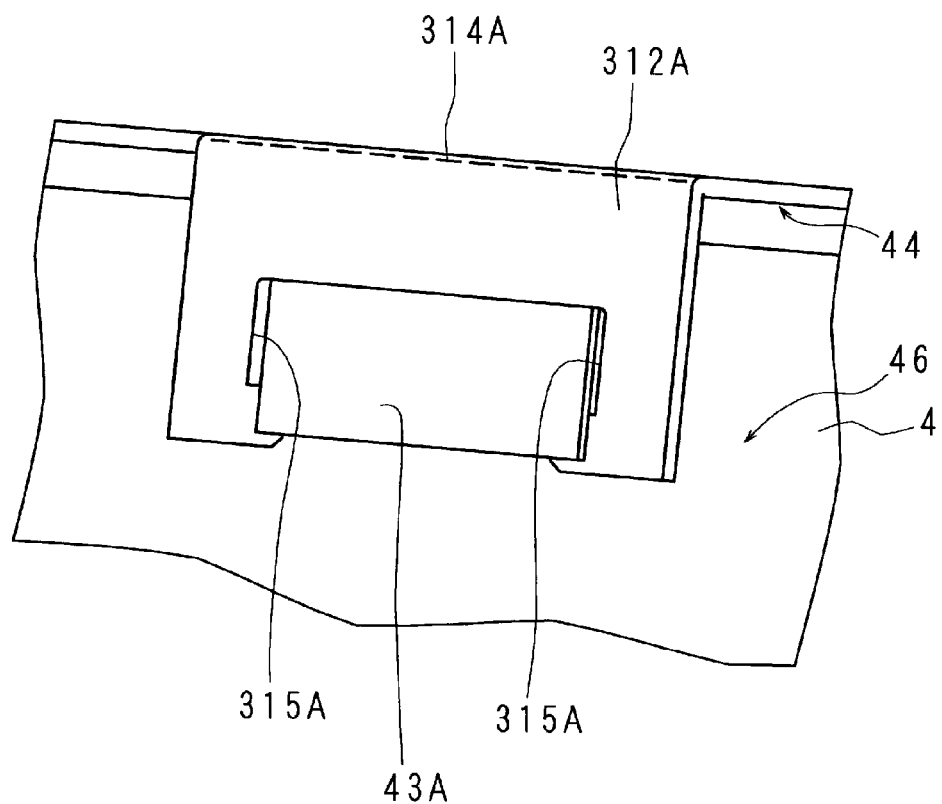
FIG. 7 is an explanatory view to illustrate another example of attachment of an optical sheet to a holding member in a television receiver according to another embodiment.

FIG. 7 is an explanatory view to illustrate another example of attachment of the optical sheet 3 to the holding member 4 in the television receiver 100 according to the embodiment. In the embodiment, the hooking part 312A sandwiches the movement-prevention part 43A in the direction along the edge of the optical sheet 3. Namely, movement-prevention part 43A is interposed between the pair of L-shaped bent portions to hold the hooking part 312A. A space is formed between the body portions of the pair of L-shaped bent portions so that the movement-prevention part 43A of the holding member 4 can be inserted. The movement-prevention part 43A is formed in a rectangular plate and protruded from the first end portion 44 of the holding member 4 in the same manner as the movement prevention part 43. When the hooking part 312A is hooked to the hooked part 46, the opposite ends, which are opposing each other along the edge of the optical sheet 3, of the rectangular movement-prevention part 43A engage with the notches 315A, 315A. Specifically, two opposite ends of the rectangular movement-prevention part 43A, other than the boundary of optical sheet 3 and a tip end parallel to the boundary, engage with the notches 315A, 315A. The length of the space between the body portions along the edge of the optical sheet 3 is longer than the length between the opposite ends of the rectangular movement-prevention part 43A. The length of a space between tip portions facing each other is shorter than the length between the opposite ends of the rectangular movement-prevention part 43A. Similar to the hooking part 312, a perforation 314A is provided at the boundary between the optical sheet 3 and the hooking part 312A.

In the television receiver 100 according to the embodiment, the hooking parts extended from the diffusion sheet 31, the prism sheet 32, and the diffusion sheet 33 are provided in different positions from each other along the edge of the optical sheet 3.

Figure 8:
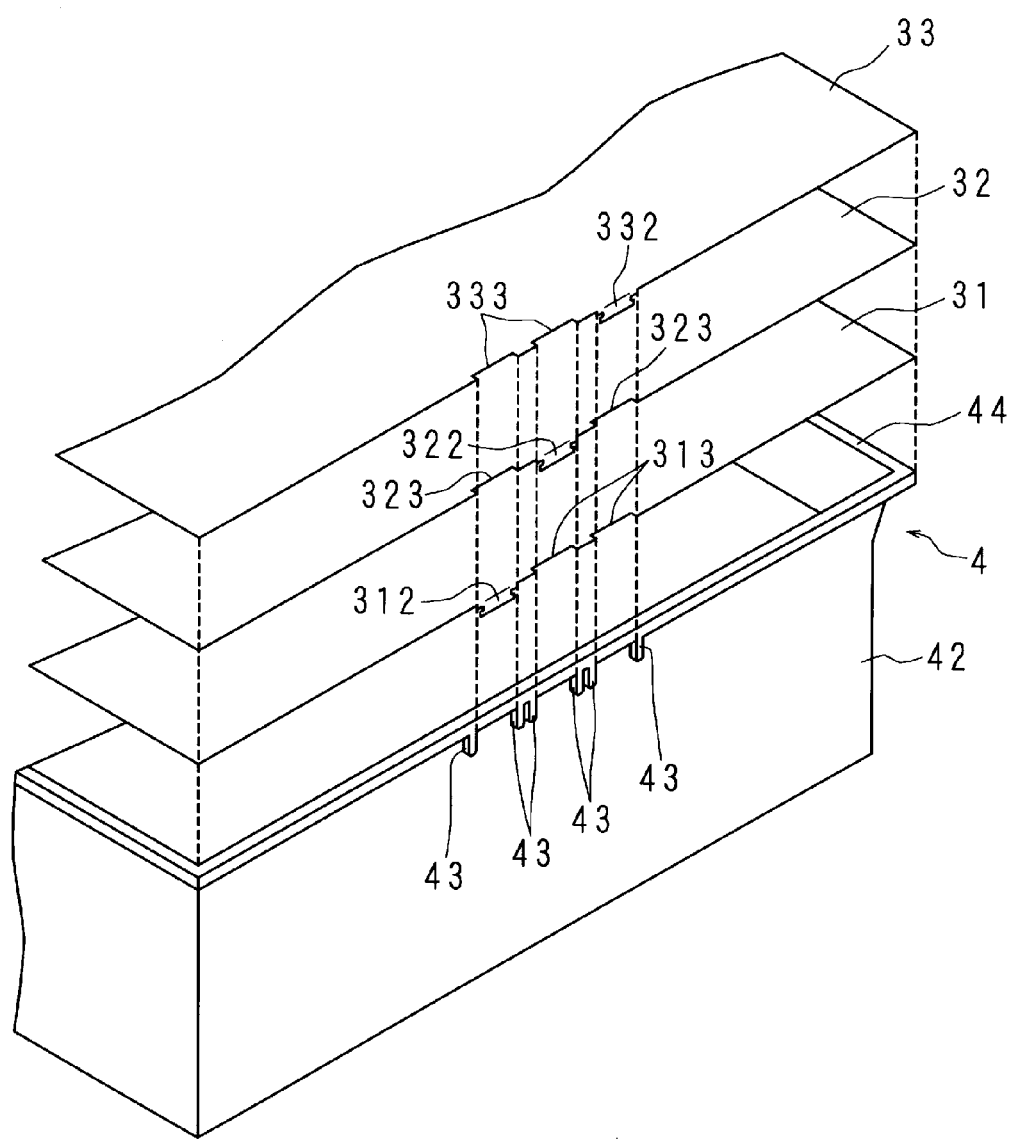
FIG. 8 is an explanatory view to show positional relation of hooking parts extended from a first diffusion sheet, a prism sheet, and a second diffusion sheet in the television receiver according to the embodiment.

FIG. 8 is an explanatory view to show the positional relation of the hooking parts of the diffusion sheet 31, the prism sheet 32, and the diffusion sheet 33 in the television receiver 100 according to the embodiment.

As shown in FIG. 8, the hooking part extended from the first sheet is provided at a position not overlapping with the hooking part extended from the at least one remaining sheet. In the embodiment, the hooking part 312 extended from the first diffusion sheet 31 is provided at a position not overlapping with the hooking parts 322, 332 each extended from the prism sheet 32 and the second diffusion sheet 33, and the hooking part 322 extended from the prism sheet 32 is provided at a position not overlapping with the hooking parts 312, 332 each extended from the first diffusion sheet 32 and the second diffusion sheet 33.

Therefore, the holding member 4 has three hooked parts 46 each having a pair of the movement-prevention parts 43 corresponding to the hooking part 312 of the diffusion sheet 31, the hooking part 322 of the prism sheet 32, and the hooking part 332 of the diffusion sheet 33. Along the edge of the optical sheet 3, position of the hooked part 46 for the hooking part 312, position of the hooked part 46 for the hooking part 322 and position of the hooked part 46 for the hooking part 332 correspond to that of hooking part 312, that of the hooking part 322 and that of the hooking part 332, respectively.

On the other hand, when the hooking part 312, the hooking part 322 and the hooking part 332 are provided in the same position along the edge of the optical sheet 3 and aligned in the stacking direction, multiple hooking parts are hooked to a single hooked part 46, and the hooking may be released.

However, in the television receiver 100 according to the embodiment, such problem can be prevented because, as mentioned above, the hooking part 312, the hooking part 322 and the hooking part 332 are provided at different positions not overlapping with other hooking parts.

On the other hand, the first diffusion sheet 31, the prism sheet 32 and the second diffusion sheet 33 are in the same rectangular shape and has the same size, and a perforation is provided at each of boundaries between the first diffusion sheet 31 and the hooking part 312, between the prism sheet 32 and the hooking part 322, and between the second diffusion sheet 33 and the hooking part 332. When the hooking part 312 of the first diffusion sheet 31, the hooking part 322 of the prism sheet 32 and the hooking part 332 of the second diffusion sheet 33 are folded along the perforations to be hooked to corresponding hooked parts 46, the following problem may arise.

For instance, similar to the arrangement shown in FIG. 2, a case where the second diffusion sheet 33, the prism sheet 32, and the first diffusion sheet 31 are stacked and attached to the holding member 4 in such order is explained. Specifically, the prism sheet 32 is disposed closer to the liquid-crystal display panel 2 relative to the first diffusion sheet 31 and the second diffusion sheet 33 is disposed closer to the liquid-crystal display panel 2 relative to the prism sheet 32.

In this case, when the hooking part 332 of the second diffusion sheet 33 is hooked to the corresponding hooked part 46 of the holding member 4, the folded hooking part 332 extends over the edges of the prism sheet 32 and the first diffusion sheet 31. Also, when the hooking part 322 of the prism sheet 32 is hooked to the corresponding hooked part 46 of the holding member 4, the hooking part 322 extends over the edge of the first diffusion sheet 31. Therefore, the edges of the prism sheet 32 and the first diffusion sheet 31 contacts and blocks the hooking part 332 of the second diffusion sheet 33, thereby hooking of the hooking part 332 to the hooked part 46 is interfered by the edges of the prism sheet 32 and the first diffusion sheet 31. Also, the edge of the first diffusion sheet 31 contacts and blocks the hooking part 322 of the prism sheet 32, thereby hooking of the hooking part 322 to the hooked part 46 is interfered by the edge of the first diffusion sheet 31.

In addition, lifting of the edges of the first diffusion sheet 31, the prism sheet 32 and the second diffusion sheet 33 may occur due to the contact between the hooking part 332 of the second diffusion sheet 33 and the edges of the prism sheet 32 and the first diffusion sheet 31 and due to the contact between the hooking part 322 of the prism sheet 32 and the edge of the first diffusion sheet 31.

In the television receiver 100 according to the embodiment, the first sheet has a recess at an edge of the first sheet, and position of the recess of the first sheet corresponds along the edge of the optical sheet to that of the hooking part extended from the at least one remaining sheet. That is explained in accordance with FIG. 8 below.

As mentioned above, in the television receiver 100 according to the embodiment, the hooking part 312 extended from the first diffusion sheet 31, the hooking part 322 extended from the prism sheet 32 and the hooking part 332 extended from the second diffusion sheet 33 are provided at different positions not overlapping with other hooking parts.

Also, the first sheet (e.g. the first diffusion sheet 31) has a recess in which hooking part extended from remaining sheets (e.g. the prism sheet 32 or the second diffusion sheet 33) is received, and position of the recess of the first sheet corresponds along the edge of the optical sheet 3 to that of the hooking part extended from the remaining sheets, allowing accommodation of the hooking part of remaining sheets.

Specifically, the first diffusion sheet 31 has recesses 313, 313 at the edge of the first diffusion sheet 31 at a position corresponding to the hooking part 322 of the prism sheet 32 and at a position corresponding to the hooking part 332 of the second diffusion sheet 33 along the edge of the optical sheet 3. Also, the prism sheet 32 has recesses 323, 323 at the edge of the prism sheet 32 at a position corresponding to the hooking part 332 of the second diffusion sheet 33 and at a position corresponding to the hooking part 312 of the first diffusion sheet 31 along the edge of the optical sheet 3. The second diffusion sheet 33 has recesses 333, 333 at the edge of the second diffusion sheet 33 at a position corresponding to the hooking part 322 of the prism sheet 32 and at a position corresponding to the hooking part 312 of the first diffusion sheet 31 along the edge of the optical sheet 3.

The recess 313, the recess 323 and the recess 333 are formed in a rectangular shape and a longitudinal direction of the recesses 313, 323, 333 is parallel to the edge of the optical sheet 3. The dimension of the recesses 313, 323, 333 in a lateral direction orthogonal to the longitudinal direction is equal to or longer than the thickness of the hooking part to be accommodated, and the dimension of the recesses in the longitudinal direction is longer than the dimension of the hooking part to be accommodated in its longitudinal direction.

Figure 9:
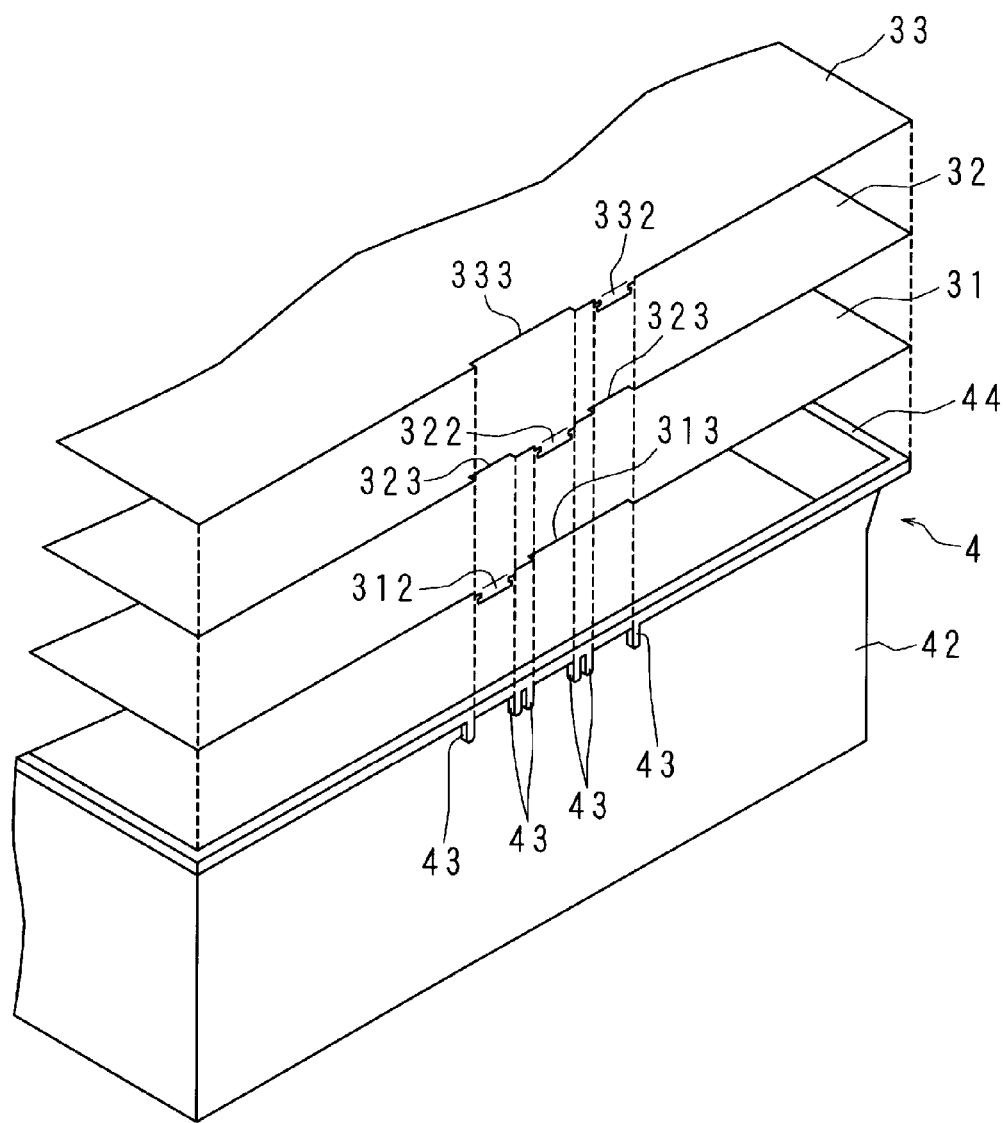
FIG. 9 is an explanatory view to show a variation of the recess of the optical sheet in the television receiver according to the embodiment.

The configuration of each recess is not limited to the above description. As shown in FIG. 9, when positions of the hooking parts are close to each other along the edge of the optical sheet 3, neighboring recesses may be merged into one wide recess which can accommodate two or more hooking parts together.

As mentioned above, during the hooking, in the television receiver 100 according to the embodiment, a recess formed on the edge of a first sheet can accommodate a hooking part extended from at least one remaining sheet, thereby preventing the edge of the first sheet from blocking the hooking part extended from at least one remaining sheet. Also, during the hooking, even though the hooking part extended from the remaining sheet contacts the edge of the first sheet, it is possible to reduce the possibilities that the contact between the edge of the first sheet and the hooking part of the remaining sheet interferes with the hooking and that lifting of the edge of the optical sheet occurs.

Also, the present invention is not limited to the above description. The recess can be formed only at the edge of one or more unit sheets if the edge of the one or more unit sheets is between the hooking part and the hooked part in the stacking direction of a plurality of stacked unit sheets of the optical sheet.

Figure 10:
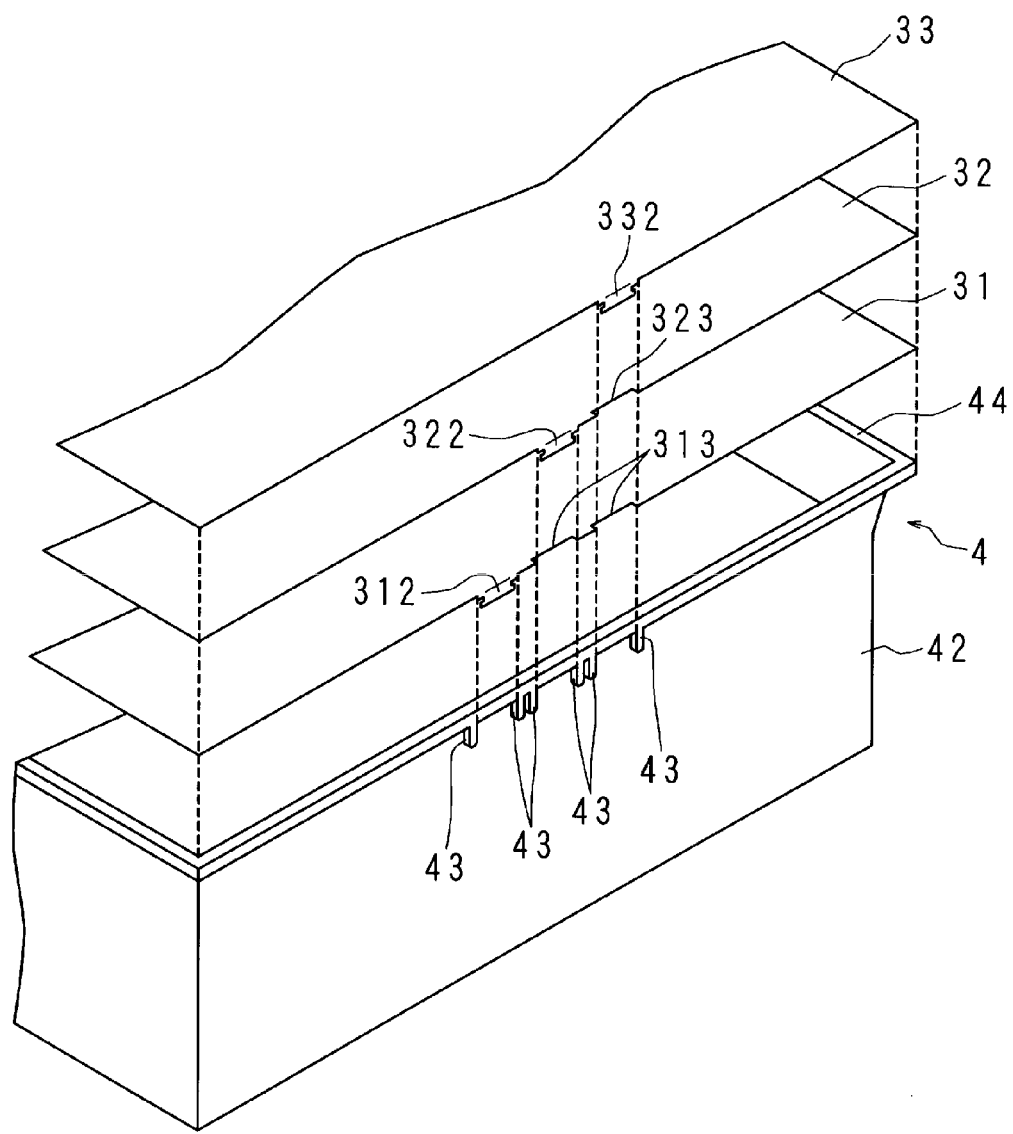
FIG. 10 is an explanatory view to show positional relation of hooking parts extended from a first diffusion sheet, a prism sheet, and a second diffusion sheet in the television receiver of FIG. 9.

FIG. 10 is an explanatory view to show the positional relation of the hooking parts of the first diffusion sheet 31, the prism sheet 32, and the second diffusion sheet 33 in a television receiver 100 according to a variation of the embodiment. As shown in FIG. 10, between the hooking part 332 extended from the second diffusion sheet 33 and the hooked part 46 corresponding to the hooking part 332 in the stacking direction, the prism sheet 32 and the first diffusion sheet 31 are disposed, and thus, the recess 323 of the prism sheet 32 and the recess 313 of the first diffusion sheet 31 are formed at the edges of the prism sheet 32 and the first diffusion sheet 31. Positions of the recess 313 and recess 323 correspond to those of the hooking part 332 and the hooking part 322, respectively. Between the hooking part 322 extended from the prism sheet 32 and the hooked part 46 corresponding to the hooking part 322 in the stacking direction, only the first sheet 31 is disposed, and thus, only the recess 313 of the first diffusion sheet 31 is formed at the edge of the first diffusion sheet 31.

In other words, in the diffusion sheet 31, the recess 313 for the hooking part 322 extended from the prism sheet 32 and the recess 313 for the hooking part 332 extended from the second diffusion sheet 33 need to be formed, and in the prism sheet 32, only the recess 323 for the hooking part 332 extended from the second diffusion sheet 33 needs to be formed. It is not necessary to form recess 333 at the edge of the diffusion sheet 33.

With this configuration, as mentioned above, it is possible to prevent the edge of a first sheet from blocking the hooking part extended from at least one remaining sheet, and during the hooking, even though the edge of the first sheet contacts the hooking part extended from the at least one remaining sheet, it is possible to reduce the possibilities that the contact between the edge of the first sheet and the hooking part extended from at least one remaining sheet interferes with the hooking and that lifting of the edge of the optical sheet occurs.

So far, examples where at least one hooking part is provided on each edge of the first diffusion sheet 31, the prism sheet 32 and the second diffusion sheet 33 are explained. However, the present invention is not limited to those.

For example, it may be configured that each of the first diffusion sheet 31, the prism sheet 32 and the second diffusion sheet 33 is formed in a rectangular shape with four sides, and the hook parts are formed only on two sides of the four sides of the first diffusion sheet 31, the prism sheet 32 and the second diffusion sheet 33. In this case, the workability for assembly is improved, and the manufacturing cost can be reduces.

In the above explanation, examples where the television receiver 100 is a display apparatus comprising a direct light type backlight are explained. However, the present invention is not limited to the examples, and the television receiver 100 may be a display apparatus comprising an edge-light type backlight.

In the above explanation, examples where the optical sheet 3 comprises the first diffusion sheet 31, the prism sheet 32 and the second diffusion sheet 33 are explained. However, the present invention is not limited to the examples. The possible configurations of the optical sheet are various, and the present invention can be applied to various optical sheets other than the ones mentioned above.

In the above, examples where the hooking part is provided in the center or around the center of each edge of the unit sheets are explained. However, the present invention is not limited thereto. In an unit sheet formed in a rectangular shape with four sides including a first side and a second side parallel to each other, and the hooking part is provided on each of the first side and the second side of the optical sheet, the hooking part of the first side confronting directly the hooking part of the second side.

In other words, in the unit sheet, the hooking part may be provided at each of the first side and the second side parallel to each other, symmetrically with respect to the central line which extends parallel to the first side and the second side between the first side and the second side. It should be noted that the hooking part may be provided in a center of or around the center of each of the first side and the second side of the optical sheet.

Further, the present invention is not limited to the above description, as described below. The display apparatus may comprises a box-shaped chassis to which the holding member is attached, the box-shaped chassis having side walls, and a positioning part for positioning the holding member, the positioning part being provided on at least one of the side walls of the box-shaped chassis, wherein the positioning part is located in a center of or around the center of the at least one of the side walls along the first or second side of the optical sheet, or located near the hooked part of the holding member. For example, the display apparatus may comprise a positioning protrusion (a positioning part) for positioning the holding member 4. The positioning part is provided on outer surface of the side wall 91. In this case, the display apparatus comprises a hole provided to the holding member 4. The position of the hole corresponds to that of the positioning protrusion. The holding member 4 is held by the backlight chassis 9 by the engagement of the positioning protrusion and the hole. In this configuration, the positioning protrusion (positioning part) is located in the center of or around the center of the side wall 91 along the first or second side of the optical sheet 3, or located near the hooked part 46.

As a result, the influence on the optical sheet 3 by the positional deviation of the movement-prevention part 43 and the hooked part 46 caused by expansion and contraction of the holding member 4 can be minimized.

What is claimed is:

1. A display apparatus comprising:
an optical sheet;
a holding member holding a peripheral part of the optical sheet; and
a hooking part extended from the optical sheet, wherein
the holding member has a hooked part to which the hooking part is hooked,
the hooked part of the holding member has at least one movement-prevention part for preventing the hooking part from moving,
the optical sheet comprises a plurality of stacked unit sheets including a first sheet and at least one remaining sheet other than the first sheet, each of the first sheet and the at least one remaining sheet having the hooking part, and
the first sheet has a recess at an edge of the first sheet, and position of the recess of the first sheet corresponds along the edge of the optical sheet to that of the hooking part extended from the at least one remaining sheet.

2. The display apparatus of claim 1, wherein a perforation is provided at a boundary between the optical sheet and the hooking part extended from the optical sheet.

3. The display apparatus of claim 1, wherein the hooking part extended from the first sheet is provided at a position not overlapping with the hooking part extended from the at least one remaining sheet.

4. The display apparatus of claim 1, wherein the at least one movement-prevention part is protruded from and is folded back at an end portion, which contacts the optical sheet at a boundary between the optical sheet and the hooking part extended from the optical sheet, of the holding member.

5. The display apparatus of claim 4, wherein
the at least one movement-prevention part comprises at least one pair of movement-prevention parts,
the holding member has a pair of rod-shaped parts as the at least one pair of movement-prevention parts,
the pair of rod-shaped parts are spaced apart from each other along the edge of the optical sheet, and
the hooking part has notches formed on opposite ends, which are opposing each other in a direction along the edge of the optical sheet, of the hooking part and each of the notches engages with each of the pair of rod-shaped parts so that the hooking part is sandwiched by the pair of rod-shaped parts.

6. The display apparatus of claim 4, wherein the at least one movement-prevention part is formed in a rectangular plate,
the hooking part has (i) a base portion whose longitudinal direction being along the boundary of the optical sheet, and (ii) a pair of L-shaped bent portions each of which having (a) a body portion protruded from the base portion and (b) a tip portion protruded along the boundary from an end of the body portion,
the pair of L-shaped bent portions are spaced apart in the longitudinal direction of the base portion and the tip portion of one of the bent portions and the tip portion of another of the bent portions face each other.

7. The display apparatus of claim 1, wherein the optical sheet is formed in a rectangular shape with four sides including a first side and a second side parallel to each other, and
the hooking part is provided on each of the first side and the second side of the optical sheet, the hooking part extended from the first side confronting directly the hooking part extended from the second side.

8. The display apparatus of claim 7, wherein the hooking part is provided in a center of or around the center of each of the first side and the second side of the optical sheet.

9. The display apparatus of claim 1, wherein the optical sheet is formed in a rectangular shape with four sides including a first side and a second side parallel to each other, and the display apparatus further comprises:
a box-shaped chassis to which the holding member is attached, the box-shaped chassis having side walls; and
a positioning part for positioning the holding member, the positioning part being provided on at least one of the side walls of the box-shaped chassis,
wherein the positioning part is located in a center of or around the center of the at least one of the side walls along the first or second side of the optical sheet, or located near the hooked part of the holding member.

10. A display apparatus comprising:
an optical sheet having a front surface and a rear surface;
a holding member holding a peripheral part of the rear surface of the optical sheet; and
a hooking part extended from the optical sheet, the hooking part having a base portion and a tip portion, wherein
the holding member has a hooked part to which the hooking part is hooked,
the hooked part of the holding member has at least one movement-prevention part for preventing the hooking part from moving,
the at least one movement-prevention part is folded back at an end portion, which contacts the optical sheet at a boundary between the optical sheet and the hooking part extended from the optical sheet, of the holding member, and
the at least one movement-prevention part is protruded from the end portion of the holding member in a direction away from the rear surface of the optical sheet in a thickness direction of the optical sheet,
the at least one movement-prevention part has an inner surface facing a center of the optical sheet, and an outer surface opposite to the inner surface,
the hooking part is sandwiched in a direction along the edge of the optical sheet by the at least one movement-prevention part or sandwiches the at least one movement-prevention part in the direction along the edge of the optical sheet when the tip portion of the hooking part is engaged with the inner surface of the at least one movement-prevention part.

11. The display apparatus of claim 10, wherein a perforation is provided at a boundary between the optical sheet and the hooking part extended from the optical sheet.

12. The display apparatus of claim 10, wherein the optical sheet comprises a plurality of stacked unit sheets including a first sheet and at least one remaining sheet other than the first sheet, each of the first sheet and the at least one remaining sheet having the hooking part, and
the hooking part extended from the first sheet is provided at a position not overlapping with the hooking part extended from the at least one remaining sheet.

13. The display apparatus of claim 10, wherein
the at least one movement-prevention part comprises at least one pair of movement-prevention parts,
the holding member has a pair of rod-shaped parts as the at least one pair of movement-prevention parts,
the pair of rod-shaped parts are spaced apart from each other along the edge of the optical sheet, and
the hooking part has notches formed on opposite ends, which are opposing each other in a direction along the edge of the optical sheet, of the hooking part and each of the notches engages with each of the pair of rod-shaped parts so that the hooking part is sandwiched by the pair of rod-shaped parts.

14. The display apparatus of claim 10, wherein the at least one movement-prevention part is formed in a rectangular plate, the hooking part has (i) a base portion whose longitudinal direction being along the boundary of the optical sheet, and (ii) a pair of L-shaped bent portions each of which having (a) a body portion protruded from the base portion and (b) a tip portion protruded along the boundary from an end of the body portion, the pair of L-shaped bent portions are spaced apart in the longitudinal direction of the base portion and the tip portion of one of the bent portions and the tip portion of another of the bent portions face each other.

15. The display apparatus of claim 10, wherein the optical sheet is formed in a rectangular shape with four sides including a first side and a second side parallel to each other, and the hooking part is provided on each of the first side and the second side of the optical sheet, the hooking part extended from the first side confronting directly the hooking part extended from the second side.

16. The display apparatus of claim 15, wherein the hooking part is provided in a center of or around the center of each of the first side and the second side of the optical sheet.

17. The display apparatus of claim 10, wherein the optical sheet is formed in a rectangular shape with four sides including a first side and a second side parallel to each other, and the display apparatus further comprises:

a box-shaped chassis to which the holding member is attached, the box-shaped chassis having side walls; and a positioning part for positioning the holding member, the positioning part being provided on at least one of the side walls of the box-shaped chassis, wherein the positioning part is located in a center of or around the center of the at least one of the side walls along the first or second side of the optical sheet, or located near the hooked part of the holding member.

* * * * *